United States Patent
Boufounos et al.

(10) Patent No.: US 10,488,520 B2
(45) Date of Patent: Nov. 26, 2019

(54) TIME-OF-FLIGHT SENSOR

(71) Applicant: Mitsubishi Electric Research Laboratories, Inc., Cambridge, MA (US)

(72) Inventors: Petros T Boufounos, Winchester, MA (US); Achuta Kadambi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 485 days.

(21) Appl. No.: 15/290,147

(22) Filed: Oct. 11, 2016

(65) Prior Publication Data

US 2018/0100926 A1  Apr. 12, 2018

(51) Int. Cl.
| | | |
|---|---|---|
| G01S 17/00 | (2006.01) | |
| G01S 17/89 | (2006.01) | |
| G01S 7/48 | (2006.01) | |
| G01S 17/42 | (2006.01) | |
| G01S 7/486 | (2006.01) | |

(52) U.S. Cl.
CPC ............ G01S 17/89 (2013.01); G01S 7/4802 (2013.01); G01S 7/4808 (2013.01); G01S 7/4865 (2013.01); G01S 17/42 (2013.01); *G01S 17/003* (2013.01)

(58) Field of Classification Search
USPC .............................................. 356/4.01, 5.01
See application file for complete search history.

(56) References Cited

U.S. PATENT DOCUMENTS

| | | | |
|---|---|---|---|
| 7,834,795 B1 | 11/2010 | Dudgeon et al. | |
| 8,982,363 B2 | 3/2015 | Goyal et al. | |
| 9,638,801 B2* | 5/2017 | Boufounos | ............. G01S 17/89 |
| 2010/0302086 A1* | 12/2010 | Dudgeon | ............. G06K 9/6289 |
| | | | 341/155 |
| 2013/0088726 A1* | 4/2013 | Goyal | ................... G01S 7/4866 |
| | | | 356/634 |
| 2014/0340487 A1* | 11/2014 | Gilliland | ............... G01S 7/4863 |
| | | | 348/48 |
| 2015/0331113 A1* | 11/2015 | Stettner | ............... B60R 21/0134 |
| | | | 701/37 |
| 2016/0146595 A1 | 5/2016 | Boufounos et al. | |

OTHER PUBLICATIONS

Ahmed Kirmani et al., "Exploiting sparsity in time of flight range acquisition using a single time resolved sensor," Optics Express, vol. 19, No. 22. Oct. 24, 2011, p. 21485.

* cited by examiner

*Primary Examiner* — James R Hulka
(74) *Attorney, Agent, or Firm* — Gennadiy Vinokur; James McAleenan; Hironori Tsukamoto

(57) ABSTRACT

A time-of-flight (TOF) sensor includes a set of optical converters; each optical converter is configured to convert a reflection of the optical pulse from an object in the scene into an analog signal indicative of a time-of-flight of the optical pulse to the object. To that end, the set of optical converters produces a set of analog signals. The TOF sensor also includes at least one modulator to uniquely modulate each analog signal from the set of analog signals to produce a set of modulated signals, a mixer to mix the modulated signals to produce a mixed signal, and an analog to digital converter to sample the mixed signal to produce a set of data samples indicative of the TOF to the scene.

16 Claims, 9 Drawing Sheets

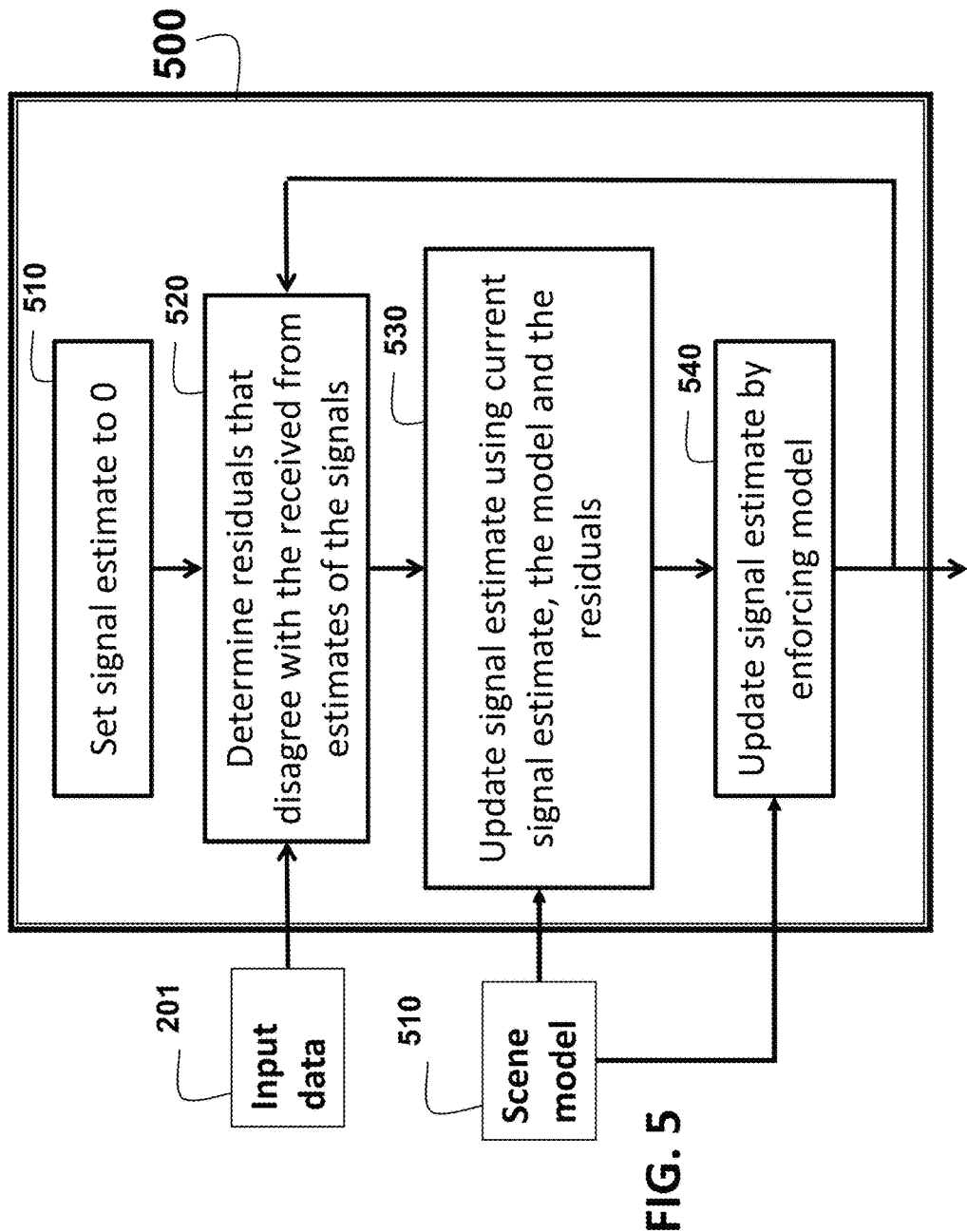

Algorithm 1 Model-based CoSaMP

510: 1: Initialize: Iteration count $l = 0$, Initial estimate $\widetilde{\mathbf{s}}^l = \mathbf{0}$
520: 2: while not converged do
     3:    Increase iteration count: $l \leftarrow l + 1$
530: 4:    Compute residual: $\mathbf{u}^l = \mathbf{r} - \mathbf{A}(\widetilde{\mathbf{s}}^{l-1})$
     5:    Compute proxy (gradient): $\mathbf{g}^l = \mathbf{A}^*(\mathbf{u}^l)$
     6:    Identify support candidate: $\mathcal{T}^l = \text{supp}(\text{trunc}(\mathbf{g}^l, K)) \cup \text{supp}(\widetilde{\mathbf{s}}^{l-1})$
540: 7:    Invert over support candidate: $\mathbf{b}^l = \mathbf{A}_{\mathcal{T}}^\dagger(\mathbf{r})$
     8:    Truncate and update: $\widetilde{\mathbf{s}}^l = \text{trunc}(\mathbf{b}^l, K)$
     9: end while
     10: return Scene estimate: $\widetilde{\mathbf{s}}^l$

FIG. 6

Algorithm 2 Model-based IHT

1: Initialize: Iteration count $l = 0$, Initial estimate $\widetilde{\mathbf{s}}^l = \mathbf{0}$
2: while not converged do
3:    Increase iteration count: $l \leftarrow l + 1$
4:    Compute residual: $\mathbf{u}^l = \mathbf{r} - \mathbf{A}(\widetilde{\mathbf{s}}^{l-1})$
5:    Compute proxy (gradient): $\mathbf{g}^l = \mathbf{A}^*(\mathbf{u}^l)$
6:    Follow gradient: $\widehat{\mathbf{s}}^l = \widetilde{\mathbf{s}}^{l-1} - \tau \mathbf{g}^l$
7:    Truncate according to model: $\widetilde{\mathbf{s}}^l = \text{trunc}(\widehat{\mathbf{s}}^l, K)$
8: end while
9: return Scene estimate: $\widetilde{\mathbf{s}}^l$ 510, 520, 530, 540

FIG. 7

TIME-OF-FLIGHT SENSOR

TECHNICAL FILED

This invention relates generally to optical sensing, and more particularly to a time-of-flight sensor producing a signal suitable for reconstructing a model of a scene.

BACKGROUND

Optical sensing measures distances to a scene by illuminating the scene with optical signal and analyzing time-of-flight (TOF) of the reflected light. One optical sensing technique, e.g., light radar (Lidar), can be used with applications such as geoscience, remote sensing, airborne laser swath mapping (ALSM), laser altimetry, contour mapping, and vehicle navigation. Conventional high-resolution, high frame-rate optical based systems typically use an array of precision sensors and illuminate the scene with singular pulses transmitted by a stationary laser or other light source. Alternatively, at the expense of reduced frame-rate, a laser scans the scene.

Compressive sensing uses fewer linear measurements than implied by the dimensionality of an acquired signal. To reduce the acquisition rate, compressive sensing reconstruction methods exploit the structure of signals. To capture the structure, the most commonly used signal model is sparsity. Compressive sensing can exploit significant gains in computational power due to the reduced sensing cost, and allow elaborate signal models and reconstruction methods, which, in turn, enable reduced sensor complexity. For example, some compressive depth sensing systems use a single sensor combined with a spatial light modulator and multiple pulses illuminating the scene.

However, even if the usage of compressive sensing can reduce the cost of TOF sensors, some TOF sensors still require a relatively expensive hardware. Accordingly, there is a need for a different architecture of a TOF sensor that can lead to reduction of the manufacturing cost.

SUMMARY

Some embodiments are based on recognition that compressive sensing methods can reduce the rate of sampling the scene and/or reduce a number of optical convertors of a time-of-flight (TOF) sensor for converting the optical signal reflected from a scene into an analog electrical signal. A TOF sensor can include a set of optical converters for converting optical signals into the analog electrical signal and a corresponding set of analog-to-digital (A/D) converters for sampling the analog electrical signal to produces data samples that can be used for scene reconstruction. To that end, the use of the compressive sensing can reduce the cost of manufacturing the TOF sensor.

Some embodiments are based on recognition that the optical converters are less expensive than A/D converters required for sampling the analog electrical signal at high rates, e.g., 1 GHz or more, to recover the scene using the compressive sensing. If there is one-to-one match between a number of A/D and optical converters, even the reduced number of A/D converters result in significantly high manufacturing cost of the TOF sensor. Accordingly, there is a need to reduce a number of the A/D converters used by the TOF sensor, while still generating data samples suitable for reconstructing the scene, e.g., as a three dimensional depth map.

Compressive sensing requires spatial and time modulation of different optical signals reflected from the scene. To that end, it is an object of some embodiments to provide such a TOF sensor that can transform incoming optical signals reflected from a scene into a set of data samples carrying information about spatial and time modulation of the optical signals. It is another object of some embodiments, to provide such a TOF that needs a reduced number of A/D converters, e.g., just one A/D converter, to generate such a set of data samples.

Some embodiments are based on realization that random and/or unique modulation can be done electronically directly on the analog electrical signal, i.e., before the sampling of the signal by the A/D converters. Such a modulation enables the spatial modulation of the reflected signals required for compressive sensing and can be done at the sufficiently high rates required for scene reconstruction. Further, if the uniquely modulated signals are mixed into, e.g., one signal, only one A/D converter is required to sample such a signal. Such a digital conversion preserves the spatial modulation, but is not sufficient to recover the scene using compressive sensing because the concurrent sampling of the mixed signal by a single A/D converter deprives the resulting measurement of the time modulation.

However, some embodiments are based on another realization that the optical pulse transmitted to the scene can be modulated in time and, thus, the time modulation of the signal can come from the signal itself. To that end, combining the time modulation of the transmitted optical signal with spatial modulation of electronic signals allows to reduce the number of A/D converters, while still allowing the TOF sensor to generate data suitable for reconstructing the scene using various compressive sensing methods.

Accordingly, one embodiment discloses a time-of-flight (TOF) sensor including a set of optical converters, each optical converter, in response to transmitting an optical pulse modulated in time to a scene, is configured to convert a reflection of the optical pulse from an object in the scene into an analog signal indicative of a time-of-flight of the optical pulse to the object to produce a set of analog signals; at least one modulator to uniquely modulate each analog signal from the set of analog signals to produce a set of modulated signals; a mixer to mix the modulated signals to produce a mixed signal; and an analog to digital converter to sample the mixed signal to produce a set of data samples indicative of the TOF to the scene.

Another embodiment discloses a system for determining a model of a scene including one or several objects including a light source to transmit the optical pulse to the scene, wherein the optical pulse is modulated in time; abovementioned TOF sensor; and at least one processor to determine the model of the scene using the set of data samples.

Yet another embodiment discloses a method for time-of-flight (TOF) sensing, including converting, in response to transmitting an optical pulse to a scene, a set of reflections of the optical pulse from at least one object in the scene into a set of analog signals indicative of a TOF of the optical pulse, wherein the optical pulse is modulated in time; uniquely modulating each analog signal from the set of analog signals to produce a set of modulated signals; mixing the modulated signals to produce a mixed signal; and sampling the mixed signal to produce a set of data samples indicative of the TOF to the scene.

BRIEF DESCRIPTION OF THE DRAWINGS

FIG. 5 is a block diagram of a scene reconstruction method according to some embodiments;

FIG. 6 is a pseudo code for the steps of the method of FIG. 5 according to one embodiment;

FIG. 7 is a pseudo code for the steps of the method of FIG. 5 according to another embodiment.

DETAILED DESCRIPTION

Figure 1:
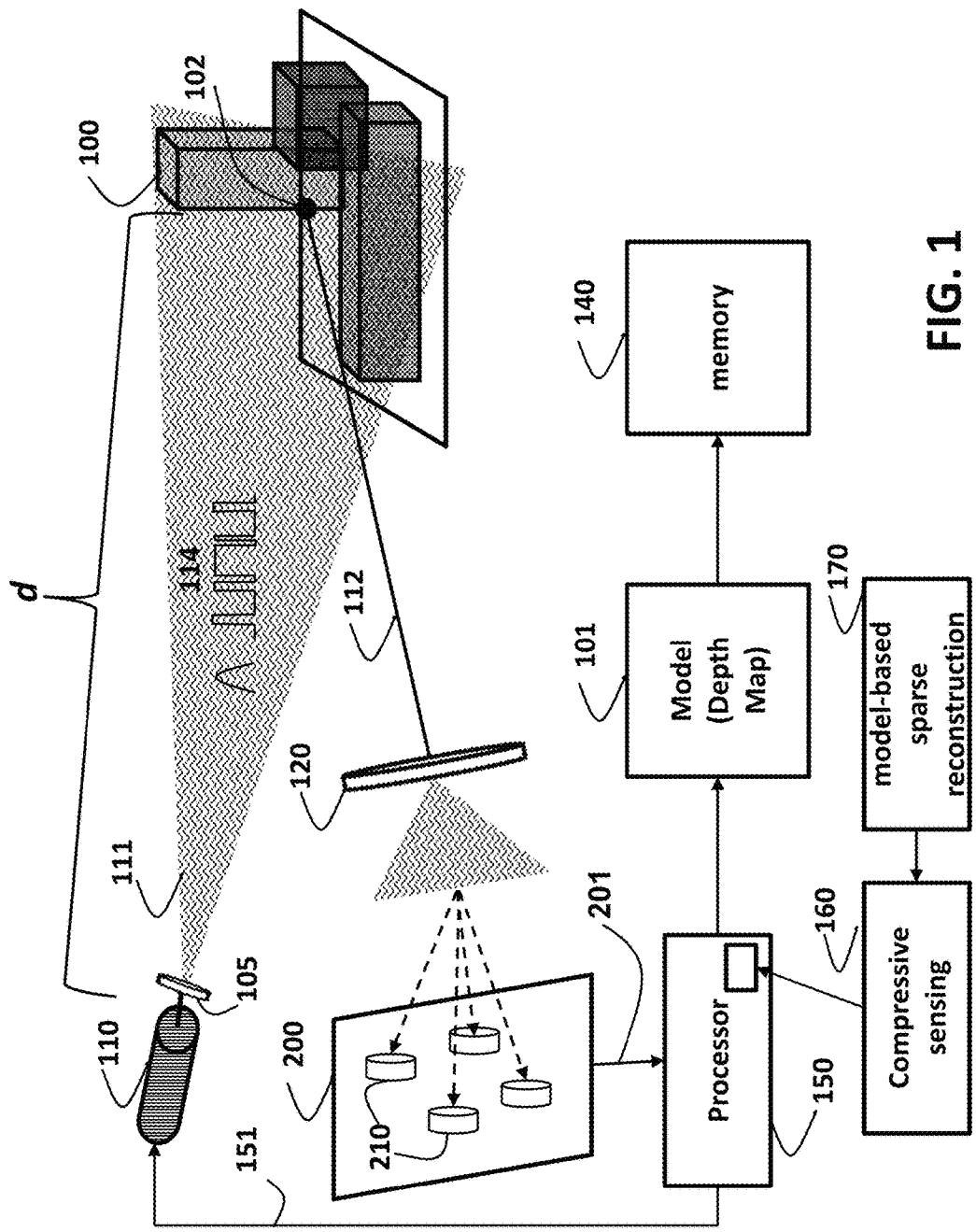
FIG. 1 is a schematic of a scene reconstruction system and method using a time-of-flight (TOF) sensor according to some embodiments.

FIG. 1 shows a schematic of a scene reconstruction system and method using time-of-flight (TOF) sensor according to some embodiments. A light source 110, e.g., a laser, transmits an optical pulse toward a scene 100. In one embodiment, a lens 105 turns the pulse into a wide optical pulse 111. By using a wide beam pulse, the scene does need to be scanned. In some embodiments, the optical pulse is modulated in time. For example, the pulse 111 can include a coded sequence of pulses 114. Such a sequence can be for example generated by turning the light source 110 ON and OFF using, e.g., a processor 150. Additionally or alternatively, the light source 110 can scan the scene with the optical pulses.

A reflected pulse 112, from each scene point 102 of an object in the scene 100, can pass through a lens 120 to the TOF sensor 200. The lens 120 focuses the reflected pulse to a set of optical converters 210 of the TOF sensor. In some embodiments, the TOF sensor 200 and/or the optical sensors 210 are arranged in a plane with the light source 110. In those embodiments, the total distance of travel of the optical pulse 111 is simply 2d. Additionally or alternatively, a memory 140 can store a relative position between the optical converters and the light source to adjust the total distance of travel of the optical pulse 111 based on that relative distance.

The output 201 of the TOF sensor 200 includes a set of data samples indicative of the TOF to the scene. The processor 150 determines the model 101 of the scene using the set of data samples 201. The model 101 can include a three dimensional depth map of the scene. In some embodiments, the model 101 is stored in a memory 140. The processor 150 can be a single core processor, a multi-core processor, a computing cluster, or any number of other configurations. The memory 140 can include random access memory (RAM), read only memory (ROM), flash memory, or any other suitable memory systems. The processor 140 and/or the memory 140 can be connected to one or more input and output devices, such as a computer monitor. Also, the memory 140 can store additional computer-vision application when executed by the processor performs at least function using the model of the scene. Additionally or alternatively, the computer-vision applications can access the model 101 through wired or wireless communication channels.

In some embodiments, the processor 150 reconstructs the model 101 of the scene from the set of data samples 201 using compressive sensing 160. For example, one embodiment uses a model-based sparse reconstruction 170. Compressive sensing requires spatial and time modulation of different optical signals reflected from the scene. To that end, the TOF sensor 200 of some embodiments transforms incoming optical signals 112 reflected from a scene into a set of data samples 201 carrying information about spatial and time modulation of the optical signals, which makes the data samples suitable for scene reconstruction with compressive sensing.

Some embodiments are based on the recognition that the optical converters are less expensive than analog-to-digital (A/D) converters required for sampling the analog electrical signal at high rates, e.g., 1 GHz or more, to recover the scene using the compressive sensing. If there is one-to-one match between a number of A/D and optical converters, even the reduced number of A/D converters result in significantly high manufacturing cost of the TOF sensor. Accordingly, there is a need to reduce a number of the A/D converters used by the TOF sensor, while still generating data samples suitable for reconstructing the scene, e.g., as a three dimensional depth map. To that end, in some embodiments, the TOF sensor includes a small number, e.g., only one A/D converter, to generate such a set of data samples.

Figure 2:
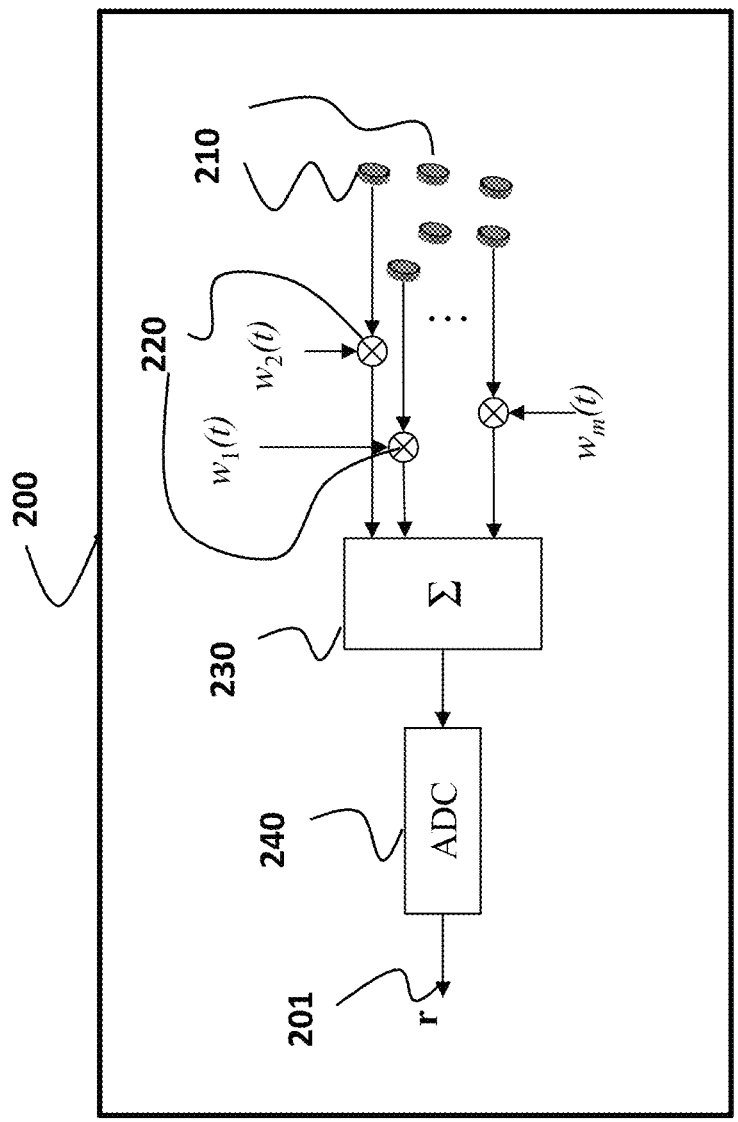
FIG. 2 is a schematic of an architecture of the TOF sensor according to one embodiment.
Figure 3:
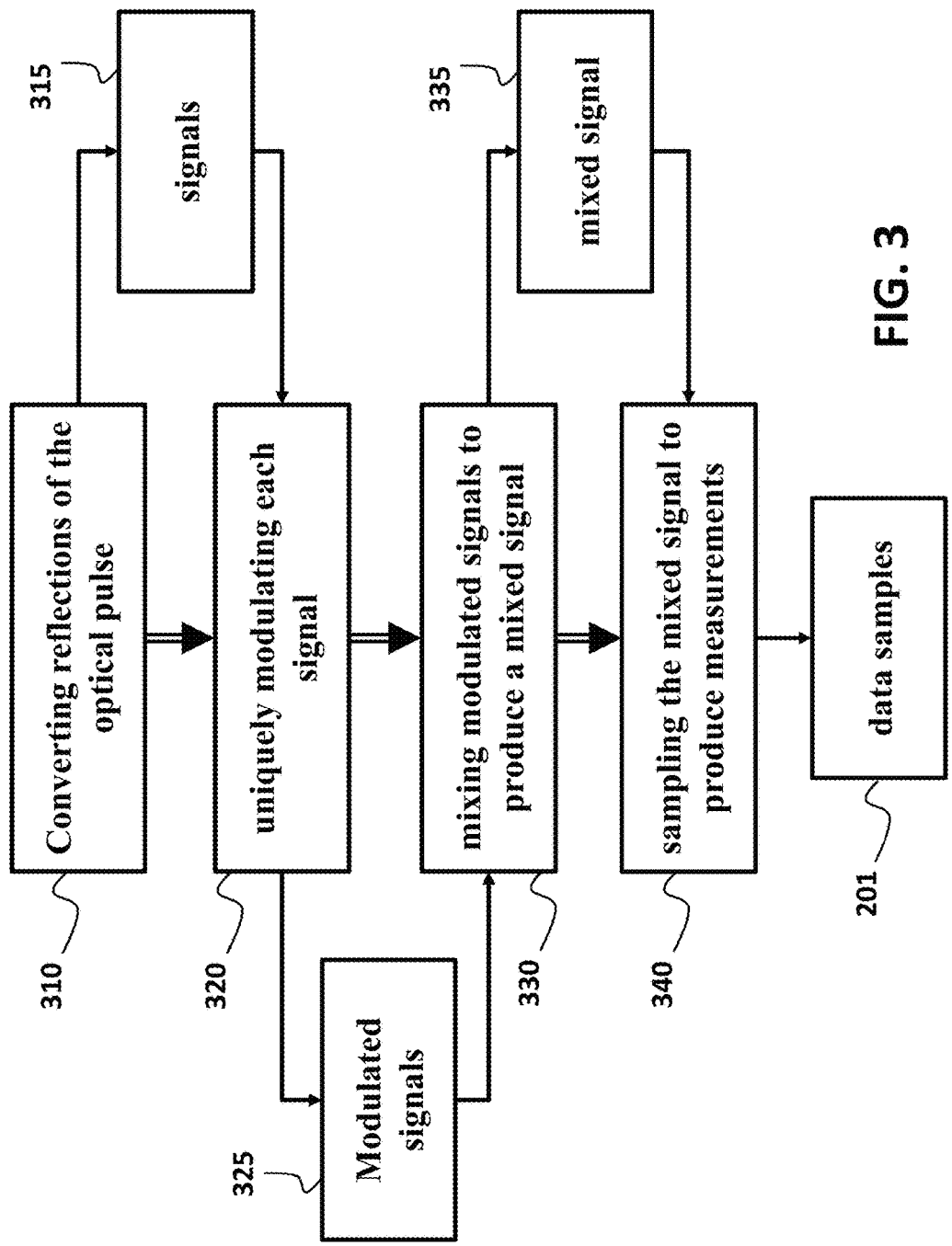
FIG. 3 is a block diagram of a method performed by the TOF sensor according to one embodiment.

FIG. 2 shows a schematic of an architecture of the TOF sensor 200 according to one embodiment. FIG. 3 shows a block diagram of a method performed by the TOF sensor 200. The TOF sensor 200 includes a set of optical converters 210, each optical converter, in response to transmitting an optical pulse modulated in time to a scene, is configured to convert 310 a reflection of the optical pulse from an object in the scene into an analog signal indicative of a time-of-flight of the optical pulse to the object to produce a set of analog signals 315. In one embodiment, the arrangement of the optical converters can be random. In another embodiment, the optical converters can be arranged as a uniform array.

Examples of the optical converters 210 include photo sensors, photo detectors and/or other sensors of light or other electromagnetic energy. Examples of the analog signal generated by the optical converters include voltage, current, and/or other electric signal. For example, a photo detector can convert light signals that hit the junction into the voltage or current. The connection uses an illumination window with an anti-reflect coating to absorb the light photons. This results in creation of electron-hole pairs in the depletion region. Photodiodes and photo transistors are few examples of photo detectors.

The TOF sensor 200 includes at least one modulator 220 to uniquely modulate 320 each analog signal from the set of analog signals 315 to produce a set of modulated signals 325. The unique modulation can be done electronically directly on the analog electrical signal, i.e., before the sampling of the signal by the A/D converters. Such a modulation enables the spatial modulation of the reflected signals required for the compressive sensing and can be done at the sufficiently high rates required for scene reconstruction.

For example, the unique modulation can be implemented as a random modulation. For example, the analog signal generated by each optical converter is multiplied by a random signal. The bandwidth of the random signal determines the depth resolution of the TOF sensor. In some embodiments, the signal is a randomized on-off sequence or ±1 waveform, which is different for each optical converter.

The TOF sensor 200 includes a mixer 230 to mix 330 the modulated signals 325 to produce a mixed signal 335. For example, in one embodiment, the modulated signals are added and filtered with a low-pass filter. When uniquely modulated signals are mixed into, e.g., one signal, only one A/D converter is required to sample such a signal. To that end, the TOF sensor 200 includes an analog to digital converter 240 to sample 340 the mixed signal 335 to produce a set of data samples 201 indicative of the TOF to the scene. To improve robustness, multiple mixers and A/D converters might be used, configured to receive the output of the optical converters. Such a digital conversion preserves the spatial modulation of the reflected signals, which, when combined with time modulation of the transmitted optical pulse, allows the reconstruction of the scene using compressive sensing, while reducing the number of relatively expensive A/D converters. For example, in one implementation, only one A/D converter is used.

Figure 4A:
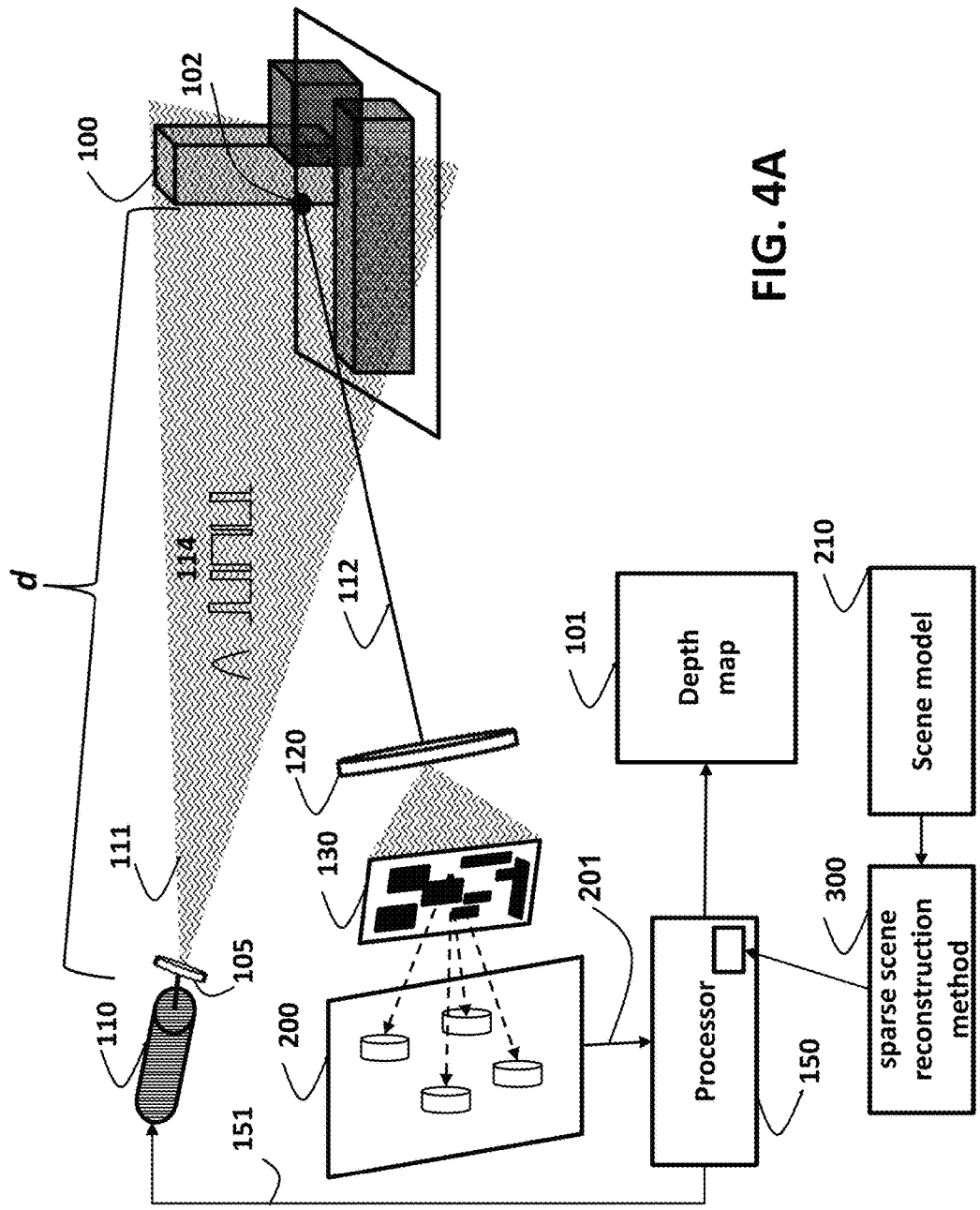
FIGS. 4A and 4B are exemplar implementations of the system for determining a model of a scene that uses optional fixed coded aperture according to different embodiments.
Figure 4B:
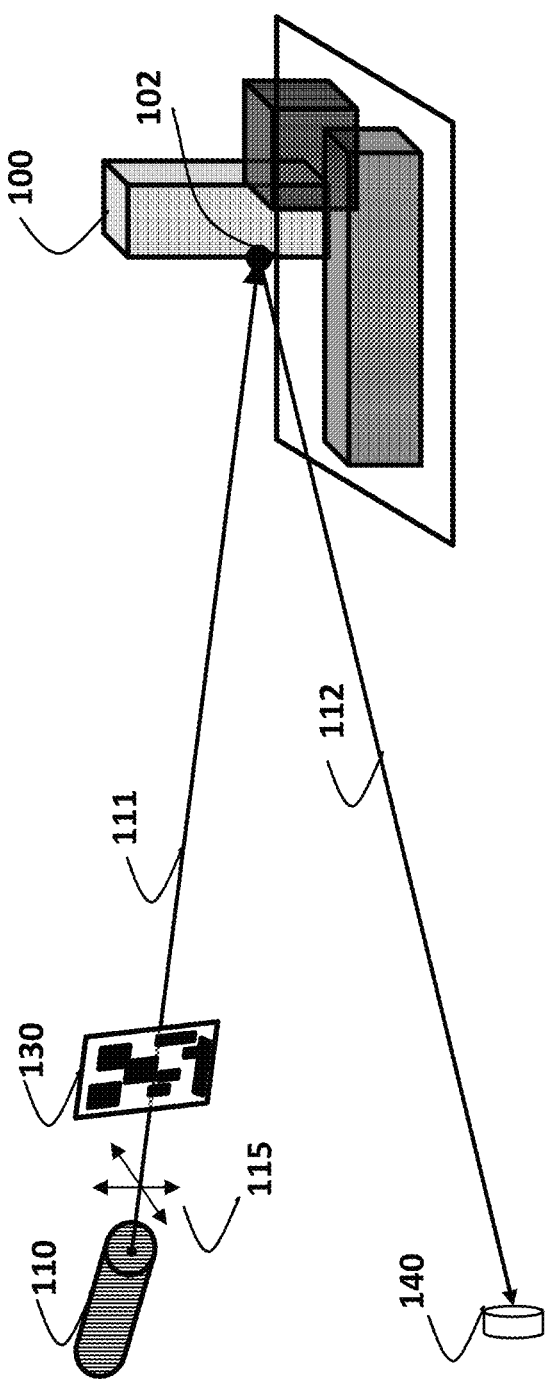

FIGS. 4A and 4B show an exemplar implementation of the system for determining a model of a scene that uses optional fixed coded aperture arranged on a path of the optical pulse between the light source and the TOF sensor according to different embodiments. For example, in FIG. 4A, the pulse dispersed by the lens 120 passes through the fixed code aperture 130 in the form of a mask in an optical path between the TOF sensor and the scene. The mask can be cheaply printed on a transparent material, e.g., an acetate sheet. The mask spatially modulates the dispersed light.

FIG. 4B shows an alternative structure of the system. In this case, the mask 130 is in an optical path between the light source and the scene 100. In this embodiment, the scene is scanned 115 by a nonstationary light source 110, and the set has only one sensor 140. As the light source scans the scene, the source transmits to the scene, through the coded aperture, one pulse at each position in the scanning path 115.

In addition, or alternatively, the sensors can be nonstationary while scanning the scene. An alternative embodiment combines the two architectures and use both a scanning laser with or without a fixed coded aperture in front of it, combined with multiple sensors behind another fixed coded aperture on the return path of the reflection, with the same or different code.

Reconstruction Method

FIG. 5 shows a scene reconstruction method 500 according to some embodiments. FIG. 6 shows a pseudo code for steps 1-10 of the method 500 according to one embodiment. FIG. 7 shows a pseudo code for steps 1-9 of the method 500 according to another embodiment. The steps iterate until the estimated signal converges to the depth map 101. The variables used in the pseudo code are described herein.

Initially, the signal estimate is set 510 (step 1) to zero. The input data 201 are in the form of a matrix of the data samples produced by the TOF sensor 200. Residuals that describe how the input data disagree with the signal estimate are determined 520 (steps 4-6) from signal the estimate and input data (signals).

Next, 530, the signal estimate is updated using the current signal estimate, the signal model, and the residuals. Depending on the reconstruction procedure, the model might or might not be used in this step.

Next, in step 540, the signal estimate is updated by enforcing the scene model 170. The process may be repeated from 520 until convergence. In one embodiment, the scene model imposes a constraint that there is at most a single reflector along any direction.

Embodiments of the method rely on a K-term truncation step, which can take various forms in different embodiments. For example, the truncation step can be a simple K-sparse approximation, as known in the art, or it can be a selection of the largest in magnitude coefficient, related to a single reflector, along every spatial direction, as described in U.S. patent application Ser. No. 13/405,504. Additionally or alternatively a graph-cuts formulation can be used as described below.

Time-of-Flight

The reconstruction for the depth map is based on time-of-flight (TOF) principles because the sensing of reflected pulse is delayed from the time the pulse is transmitted due to the distance 2d. The delay corresponds to the distance to, or depth of each point 102 in the scene.

Some embodiments avoid separation of the reflected pulses from each direction to determine the TOF and assigning the delay to the correct place in the depth map 101. In contrast, one embodiment uses compressive sensing (CS) principles and intentionally mixes the pulse reflected in all directions to reduce the sampling burden. Therefore, the embodiment relies on computational methods to separate the mixture and assign the correct depth value to each point in the scene.

Compressive Sensing (CS) has emerged as a powerful sensing framework, demonstrating that signals can be acquired using much fewer linear measurements than their dimension implies. To reduce the acquisition rate, CS reconstruction algorithms exploit the structure of acquired signals. To capture structure, the most commonly used signal model is sparsity: the signal comprises a linear combination of very few atoms selected from a basis or a dictionary. A few other models, such as signals lying on low-dimensional manifolds and signals with low total variation (TV) have also been shown to be suitable for compressive acquisition.

A CS-based acquisition system can be modeled as $$r = A(s), \quad (1)$$

where $A(\cdot)$ is a linear function, s belongs in some appropriate signal space, and r belongs in the measurement space. The latter space has much lower dimension than the former. A number of possible properties of $A(\cdot)$—such as low coherence, the Restricted Isometry Property, or others, depending on the model—guarantee that reconstruction is possible using an appropriate algorithm.

Signal Model

Model-based CS framework provides a general approach to developing a large number of signal models and characterizing their suitability for CS acquisition. Models under this framework can be created by imposing restrictions on the signal support. A fundamental operation is the projection of a general signal to the set of signals that satisfy the model's support restrictions. As long as such a projection can be computed, greedy CS reconstruction methods, such as Compressive Sampling Matching Pursuit (CoSaMP) and Iterative Hard Thresholding (IHT) can be modified to reconstruct signals in the model.

For example, a signal $s \in \mathbb{R}^{N \times T}$ in this model is a matrix with N rows and T columns. Each row of the signal only has S non-zero entries, which should be spatially close to the S non-zero entries of the row above or below. This is enforced by restricting the EMD between the support of subsequent rows of the signal. The projection under this signal model is performed by solving a sequence of network flow problems.

On embodiment is based on recognition that a restricted version of this model, with S=1 is a good model for LIDAR scenes. However, this model requires extension of to 3-D volumes, namely signals $s \in \mathbb{R}^{N_x \times N_y \times T}$. To that end, some embodiment develops an extension for the restricted case of S=1.

To model the system, some embodiments start with a single reflecting scene point at distance d from the sensing plane, and assume there is no coded aperture. For convenience, some embodiments use the light source 110 coplanar with the sensors. Thus, the distance the pulse travels from the light source to the reflecting scene point and back to the sensors is 2d, corresponding to a pulse delay, i.e., TOF, τ=2d/c, where c is the speed of light in the medium. Using this correspondence, time is equivalent to distance from the sensor plane, i.e., depth. Herein, distance and depth is used interchangeably.

Some embodiments consider a 3-D scene comprising two spatial directions, transverse to the sensor plane, and one depth direction, which is time or delay, and is perpendicular to the sensor plane. Thus, the scene to be acquire can be represented by a function $s_{x,y,t}$, where s represents the reflectivity of the scene at point (x,y,t). If there is no reflection from a point, then the corresponding reflectivity is zero.

Lambertian surfaces with no transparency imply that, for any (x, y) pair, there is only one depth t that has non-zero reflectivity. In other words, if there is a reflection from (x, y, t), then there is no reflector in-between that location and the sensing plane, i.e., in front of the reflector. Furthermore, the light does not reach any reflectors behind that point for the same (x, y) pair, and, therefore, their reflectivity is also zero. This constraint, in the context of coherent sensing systems, as a depth constraint on s. A valid scene signal s should satisfy this depth constraint.

Given a depth map $d_{x,y}$, representing the depth of the scene at coordinates (x, y), and a reflectivity (albedo) map $\alpha_{x,y}$ for the same coordinates, the scene is can be represented by $$s_{x,y,t} = \alpha_{x,y} \delta_{t-2d_{x,y}/c}, \quad (1)$$

where $\delta_t$ is the Dirac impulse function. For any scene satisfying the depth constraint, it is trivial to extract depth and albedo maps. In other words, a 3D scene corresponds to a 2D depth map and a 2D albedo map. Similarly, a 2D (one space and one depth dimension) scene corresponds to a 1D depth map and a 1D albedo map.

Acquisition Model

Let $p_t$ to denote the transmitted pulse, which gets reflected by the scene. Then the received reflection at location (x, y) is equal to $$\hat{r}_{x,y,t} = \alpha_{x,y} p_{t-2d_{x,y}/c} = p_t \#_t s_{x,y,t}, \quad (3)$$

where $\#_t$ denotes linear convolution along the time direction. The addition of a coded aperture, with spatial code $c_{x,y}$, introduces a mixing of the received signal, which can be shown to be the spatial convolution of $\hat{r}_{x,y,t}$ with the mask. Thus, the received light flux at the sensor plane is equal to $$\tilde{r}_{x,y,t} = c_{x,y} \#_{x,y} \hat{r}_{x,y,t} = c_{x,y} \#_{x,y} p_t \#_t s_{x,y,t}. \quad (4)$$

This signal is sensed by M optical converters, indexed by m=1, ..., M, each positioned at location $(x_m, y_m)$. Each optical converters measures the light flux at the sensor plane and outputs $\bar{r}_{m,t} = \tilde{r}_{x_m,y_m,t}$ in time. That signal is modulated with a modulation signal $w_{m,t}$, which is different for each converter m, to produce $\bar{r}_{m,t} w_{m,t}$. The signals are then mixed to produce $$r_t = \Sigma_m \bar{r}_{m,t} w_{m,t} = \Sigma_m \tilde{r}_{x_m,y_m,t} w_{m,t}. \quad (5)$$

In some embodiments, multiple waveforms $w_{l,m,t}$ might be used to produce different modulations of each signal, indexed by l=1, ..., L, and then multiple summations be performed to produce $$r_{l,t} = \Sigma_m \bar{r}_{m,t} w_{l,m,t} = \Sigma_m \tilde{r}_{x_m,y_m,t} w_{l,m,t}. \quad (6)$$

One embodiment discretizes the scene to $s \in \mathbb{R}^{N_x, N_y, N_t}$, where $N_x$, $N_y$ is the number of spatial pixels to be acquired—specified as the desired resolution of the system—and $N_t$ is the number of time samples. The discretization is such that each reflector can be assumed approximately flat and parallel to the sensor plane over the area of a pixel, such that the depth constraint is preserved in the discrete representation. Furthermore, the time is sampled at a rate higher than the pulse Nyquist rate. Similarly, we discretize the pulse, the coded aperture mask, and the received signals, such that the convolution with the pulse and the mask shape can be expressed in discrete-time.

The sampled received signal, $r \in \mathbb{R}^{L, N_t}$ can then be computed as a sequence of linear transformations $$r = S(W(C(P(s)))) = A(s), \quad (7)$$

where P, C, W and S denote, respectively, the linear transformations due to the pulse, the mask of the coded aperture if present, the modulation, the mixing, e.g., summing, sampling of the measured field by the modulation and ADCs electronics, and the low-pass filtering and sampling of the modulated signals. Their composition, A, is the forward linear transformation mapping the scene s to the received signal r.

Model Implementation

Efficient computation using the linear model in (7) is paramount in modern iterative reconstruction methods. To this end, the operators P and M can be efficiently implemented in discrete time using FFT-based convolution algorithms. The modulation W is a simple multiplication, and S is a simple low-pass filter. The adjoint A*, necessary for most reconstruction algorithms, is also trivial to implement by composing the adjoint of each operator in the reverse order, i.e., using A*(r)=P*(C*(S*(W*(r)))).

An efficient implementation can use a depth map d and albedo a representation to significantly reduce memory requirements. The forward operator can be determined efficiently from such a representation, although the adjoint requires additional temporary memory to store the entire s.

Depth Reconstruction

Depth Scenes, Variation and Network Flows

In one embodiment, to reconstruct a subsampled signal and provide robustness to noise, CS exploits the structure of the acquired signal. In particular, depth maps have been shown to have low TV norm. Signals with low TV norms are generally flat, with very few discontinuities and very few areas with small gradients. The ($\ell_1$) TV norm of a discrete map $d \in \mathbb{R}^{N_x \times N_y}$, is defined as $$\|d\|_{TV} = \|\nabla_x d\|_1 + \|\nabla_y d\|_1, \quad (8)$$

where $\nabla_x d$ is the discrete gradient along direction x and $\|\cdot\|_1$ is the element-wise $\ell_1$ norm of a matrix, i.e., $$\|\nabla_x d\|_1 = \Sigma_{n_y=1}^{N} \Sigma_{n_x=1}^{N-1} |d_{n_x,n_y} - d_{n_x+1,n_y}|, \quad (9)$$

with the y direction similarly defined.

Given a scene satisfying the depth constraint, an additional constraint on the TV norm of the depth map is exactly equivalent to a constraint on the support of the non-zeros in s. Specifically, two spatially adjacent non-zero coefficients of s, i.e., with respect to the $n_x$ and $n_y$ coordinates, can also have similar depth, i.e., $n_t$ coordinate, except for very few discontinuities. However, this one-to-one correspondence requires that s satisfies the depth constraint. A general, dense s does not; a projection to both the depth and the TV constraints is, thus, used for model-based CS algorithms, such as CoSaMP and IHT.

For a one-dimensional depth map problem, i.e. for $s \in \mathbb{R}^{N_x, N_t}$ and $d \in \mathbb{R}^{N_x}$, such a projection provides a solution where 2-D signals are represented as a matrix. Each row of the matrix has only S non-zeros, and the support of those non-zeros from row to row changes very little, according to a pre-determined constraint on the total EMD between supports. When S=1, the EMD constraint applied to s becomes a TV constraint on its support, i.e., on the depth map. The projection onto the constraint can be computed using a sequence of simple dynamic programs solving a network flow. Unfortunately, this approach does not always generalize to 2-D depth maps.

2D Variation and Graph Cuts

To generalize the projection to 3-D objects, i.e., 2-D depth maps, some embodiments use a graph cuts formulation. For an undirected, weighted graph $\mathcal{G} = (\mathcal{V}, \varepsilon)$, one embodiment considers the general graph cuts problem. That is, given a set of observations X, the task is to assign each vertex $v \in \mathcal{V}$ a label $l_v \in \mathcal{L}$ such that the joint labeling of all vertices, l, minimizes an energy function between labels and observations E (l, X).

In the depth sensing problem, the embodiment maps each vertex to represent a spatial location $v=(n_x, n_y)$ of the scene, and each label to represents a discrete depth value $l_v = d_{n_x, n_y}$. Hence, the cardinality of sets $\mathcal{V}$ and $\mathcal{L}$ is $N_x N_y$ and $N_t$, respectively. One variation also map the set of observations X to the scene s.

The energy function can be expressed as a sum of unary and pairwise terms $$E(l, s) = -\underbrace{\sum_{v \in \mathcal{V}} s_{v,l_v}^2}_{Unary} + \underbrace{\sum_{\substack{u \in \mathcal{V} \\ u \in \mathcal{N}_v}} \lambda |l_v - l_u|}_{Pairwise} = -\sum_{(n_x, n_y) \in \mathcal{V}} s_{n_x, n_y, d_{n_x, n_y}}^2 \quad (10)$$

$$+ \sum_{\substack{(n_x, n_y) \in \mathcal{V} \\ (n_{x'}, n_{y'}) \in \mathcal{N}_{n_x, n_y}}} \lambda |d_{n_x, n_y} - d_{n_{x'}, n_{y'}}|, \quad (11)$$

where $\mathcal{N}_{n_x, n_y} = \{(n_{x+1}, n_y), (n_{x-1}, n_y), (n_x, n_{y+1}), (n_x, n_{y-1})\}$ is the neighborhood of $\mathcal{N}_{n_x, n_y}$ (i.e. $\mathcal{N}_v$ contains all vertices that are directly adjacent to $v=(n_x, n_y)$ in the graph).

The unary term is a fidelity term which uses the label, i.e., the depth value, to select the appropriate data point from the scene s and impose an $\ell_2$ data penalty. The pairwise term imposes a smoothness constraint between the label of v and the label of vertices in the neighborhood set $\mathcal{N}_v$. Thus, the pairwise term from equation 10 is the $\ell_1$ norm of the gradient of depth values, i.e., the TV norm of d. Analogous to Rudin-Osher-Fatemi total-variation, the parameter $\lambda$ weights the tradeoff between data fidelity and smoothness. Solvers for minimizing (10) are available, such as alpha-expansion and alpha-beta swap as well as Boolean approaches.

For example, one embodiment uses an alpha-expansion method. The truncation step of our model-based algorithm incorporates a K-term truncation of s by first optimizing (10) to obtain a candidate depth map, which corresponds to a candidate support set $(n_x, n_y, d_{n_x, n_y})$. From this candidate support set, the largest K components of s are selected to be used by the appropriate step of model-based CoSaMP or IHT methods. One embodiment selects the K largest components of the data s not constrained by the graph cuts solution. This model-based thresholding produces a scene s that (a) satisfies the depth constraint and (b) has low depth TV.

Scene Reconstruction

Given a projection, such as the one described above, some embodiments reconstruct the scene to recover the actual depth map. The pseudo codes of two alternative embodiments are demonstrated in FIGS. 6 and 7.

FIG. 6 describes a pseudo code of an iterative method performing scene reconstruction based on model-based CoSaMP (compressive sampling matching pursuit). An iteration count l and a signal estimate $\tilde{s}^l$ are maintained and updated throughout each iteration. Step 1 initializes them to 0. Step 3 increases the iteration count. Step 4 computes a residual $u^l$, which captures the disagreement of the signal estimate $\tilde{s}^{l-1}$ with the data r. A proxy $g^l$ for the scene is computed in Step 5, which is also the gradient of a cost function at the current scene estimate $\tilde{s}^{l-1}$. Step 6 uses a model-based truncation function such as the one described above to determine the support of the proxy, truncated to K coefficients according to the model, denoted supp(trunc($g^l$, K)). Note that alternative embodiments could use a different truncation length such as 2K or K/2. This support is united with supp($\tilde{s}^{l-1}$), the support of the current signal estimate to form a support candidate $T^l$. A new temporary signal estimate $b^l$ is formed in Step 7 by inverting the system restricted over the support candidate. The temporary signal estimate is truncated in step 8 to update the signal estimate $\tilde{s}^l$. Steps 3-8 may be iterated until the convergence of the algorithm or for a finite number of iterations. Convergence can be measured, for example, by the magnitude of the residual computed in step 4, or by the amount of change in the signal estimate $\tilde{s}^l$ from iteration to iteration. The final signal estimate after convergence, $\tilde{s}^l$, is returned at Step 10.

FIG. 7 describes a pseudo code of an iterative method performing scene reconstruction based on model-based IHT (iterative hard thresholding). An iteration count l and a signal estimate $\tilde{s}^l$ are maintained and updated throughout each iteration. Step 1 initializes them to 0. Step 3 increases the iteration count. Step 4 computes a residual $u^l$, which captures the disagreement of the signal estimate $\tilde{s}^{l-1}$ with the data r. A proxy $g^l$ for the scene is computed in Step 5, which is also the gradient of a cost function at the current scene estimate $\tilde{s}^{l-1}$. An alternative temporary scene estimate $\hat{s}^l$ is formed in Step 6, by following the gradient with a step size $\tau$. The temporary signal estimate is truncated in step 7 to update the signal estimate $\tilde{s}^l$. Steps 3-8 may be iterated until the convergence of the algorithm or for a finite number of iterations. Convergence can be measured, for example, by the magnitude of the residual computed in step 4, or by the amount of change in the signal estimate $\tilde{s}^l$ from iteration to iteration. The final signal estimate after convergence, $\tilde{s}^l$, is returned at Step 9.

Figure 8:
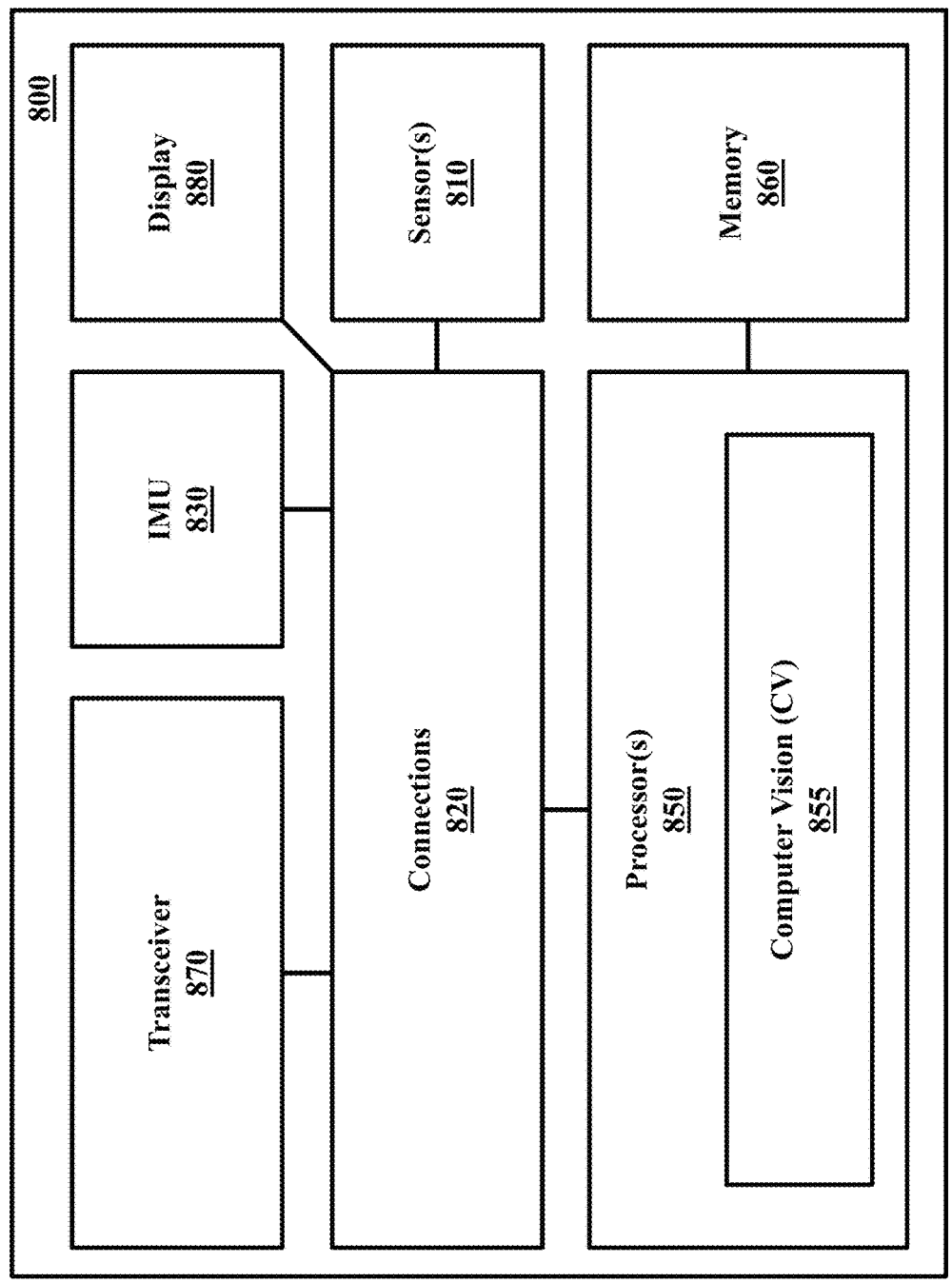
FIG. 8 is a block diagram of an exemplary system configured for determining a model of a scene according to some embodiments.

FIG. 8 shows a block diagram of an exemplary system 800 configured for determining a model of a scene including one or several objects according to some embodiments. The system 800 can be implemented internal and or external to the TOF sensor 200. Additionally or alternatively, the system 800 can be communicatively connected to the TOF sensor 200 for performing the scene reconstruction.

The system 800 can include one or combination of a camera 810, an inertial measurement unit (IMU) 830, a processor 850, a memory 860, a transceiver 870, and a display/screen 880, which can be operatively coupled to other components through connections 820. The connections 820 can comprise buses, lines, fibers, links or combination thereof.

The transceiver 870 can, for example, include a transmitter enabled to transmit one or more signals over one or more types of wireless communication networks and a receiver to receive one or more signals transmitted over the one or more types of wireless communication networks. The transceiver 870 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 800 can comprise image sensors such as CCD or CMOS sensors, lasers and/or camera 810, which are hereinafter referred to as "sensor 810". For example, the sensor 810 can convert an optical image into an electronic or digital image and can send acquired images to processor 850. Additionally or alternatively, the sensor 810 can sense the light reflected from a target object in a scene and submit the intensities of the captured light to the processor 850. The sensor 810 can include the TOF sensor 200. In one embodiment, data captured by the sensor 410 can be in a raw uncompressed format and can be compressed prior to being processed and/or stored in memory 860. In some embodiments, image compression can be performed by the processor 850 using lossless or lossy compression techniques.

In some embodiments, the processor 450 can also receive input from an IMU 830. In other embodiments, the IMU 430 can comprise 3-axis accelerometer(s), 3-axis gyroscope(s), and/or magnetometer(s). The IMU 830 can provide velocity, orientation, and/or other position related information to the processor 850. In some embodiments, the IMU 830 can output measured information in synchronization with the capture of each image frame by the sensor 810. In some embodiments, the output of the IMU 830 is used in part by the processor 850 to fuse the sensor measurements and/or to further process the fused measurements.

The system 800 can also include a screen or display 880 rendering images, such as color and/or depth images. In some embodiments, the display 880 can be used to display live images and/or model of the scene determined using the sensor 810. In some embodiments, the display 480 can include and/or be housed with a touchscreen to permit users to input data via some combination of virtual keyboards, icons, menus, or other GUIs, user gestures and/or input devices such as styli and other writing implements. In some embodiments, the display 480 can be implemented using a liquid crystal display (LCD) display or a light emitting diode (LED) display, such as an organic LED (OLED) display. In other embodiments, the display 880 can be a wearable display.

In some embodiments, the result of the scene reconstruction can be rendered on the display 880 or submitted to different applications that can be internal or external to the system 800. For example, a computer vision (CV) application 855 running on the processor 850 can implement and execute computer vision based tracking, model-based tracking, and/or simultaneous localization and mapping (SLAM) methods.

Exemplary system 800 can also be modified in various ways in a manner consistent with the disclosure, such as, by adding, combining, or omitting one or more of the functional blocks shown. For example, in some configurations, the system 800 does not include the IMU 830 or the transceiver 870. Further, in certain example implementations, the system 800 include a variety of other sensors (not shown) such as an ambient light sensor, microphones, acoustic sensors, ultrasonic sensors, laser range finders, etc. In some embodiments, portions of the system 800 take the form of one or more chipsets, and/or the like.

The processor 850 can be implemented using a combination of hardware, firmware, and software. The processor 850 can represent one or more circuits configurable to perform at least a portion of a computing procedure or process related to sensor fusion and/or methods for further processing the fused measurements. The processor 850 retrieves instructions and/or data from memory 860. The processor 850 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 860 can be implemented within the processor 850 and/or external to the processor 450. As used herein the term "memory" refers to any type of long term, short term, volatile, nonvolatile, or other memory and is not to be limited to any particular type of memory or number of memories, or type of physical media upon which memory is stored. In some embodiments, the memory 460 holds program codes that facilitate sensor fusion and/or one or more image processing, perform SLAM, tracking, 3D reconstruction, and other tasks performed by CV 855 on processor 850.

For example, the memory 860 can store the measurements of the sensors, as well as data provided by the IMU 830 and other sensors. In general, the memory 860 can represent any data storage mechanism. The memory 860 can include, for example, a primary memory and/or a secondary memory. The primary memory can include, for example, a random access memory, read only memory, etc. While illustrated in FIG. 8 as being separate from the processors 850, it should be understood that all or part of a primary memory can be provided within or otherwise co-located and/or coupled to the processors 850.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 860 and/or the processor 850.

In some embodiments, the CV 855 can implement various computer vision methods and/or process images captured by the sensor 810. For example, the CV 855 can be configured for processing one or more images captured by the sensor 810 to perform reconstruction of an environment being modeled using the depth information associated with the captured images.

Based on the depth data, during reconstruction each pixel can be assigned a 3D coordinate. In one embodiment, the CV 855 on the processor 850 tracks the position of the sensor 810 by using a monocular (single camera) visual SLAM system to build a coarse map of the environment around the MS for accurate and robust 6DOF tracking of the sensor 810. The term monocular refers to the use of a single non-stereoscopic camera to capture images or to images captured without depth information. Other reconstruction method can then use the camera pose and per-pixel depth information to extrude the captured image(s) along a viewing direction. For example, in one embodiment the processor 850 is configured to track an object in the scene using the fused set of measurements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A time-of-flight (TOF) sensor, comprising:
a light source configured to transmit to a scene an optical pulse modulated in time as a coded sequence of pulses;
a set of optical converters, each optical converter is configured to convert a reflection of the optical pulse from an object in the scene into an analog signal indicative of a time-of-flight of the optical pulse to the object to produce a set of analog signals;
at least one modulator configured to uniquely modulate each analog signal from the set of analog signals with a different unique code to produce a set of modulated signals, such that each modulated signal is incoherent to all other modulated signals in the set and to the transmitted coded sequence of pulses;
a mixer to mix the modulated signals to produce a mixed signal; and
an analog to digital converter to sample the mixed signal to produce a set of data samples indicative of the TOF to the scene.

2. A system for determining a model of a scene including one or several objects, comprising:
the TOF sensor of claim 1; and
at least one processor to determine the model of the scene using the set of data samples.

3. The system of claim 2, further comprising:
a memory storing a relative position between the optical converters and the light source.

4. The system of claim 2, further comprising:
a sensor to measure a relative motion between the system and the scene, wherein the processor uses the relative motion in determining the model of the scene.

5. The system of claim 2, wherein an arrangement of the set of optical converters is coplanar with the light source.

6. The system of claim 2, further comprising:
a memory storing a computer-vision application when executed by the processor performs at least function using the model of the scene.

7. The system of claim 2, wherein an arrangement of the set of optical converters forms a uniform array.

8. The system of claim 2, further comprising:
a fixed coded aperture arranged on a path of the optical pulse between the light source and the TOF sensor.

9. The system of claim 2, wherein the optical pulse includes a coded sequence of pulses.

10. The system of claim 2, wherein the processor reconstructs the model of the scene from the set of data samples using a compressive sensing.

11. The system of claim 10, wherein the compressive sensing uses a model-based sparse reconstruction.

12. The TOF sensor of claim 1, wherein the modulator is a random modulator.

13. The TOF sensor of claim 1 including only one analog to digital converter.

14. A method for time-of-flight (TOF) sensing, comprising:
transmitting to a scene an optical pulse modulated in time as a coded sequence of pulses;
converting, in response to transmitting the optical pulse to the scene, a set of reflections of the optical pulse from at least one object in the scene into a set of analog signals indicative of a TOF of the optical pulse, wherein the optical pulse is modulated in time;
uniquely modulating each analog signal from the set of analog signals with a different unique code to produce a set of modulated signals, such that each modulated signal is incoherent to all other modulated signals in the set and to the transmitted coded sequence of pulses;
mixing the modulated signals to produce a mixed signal; and
sampling the mixed signal to produce a set of data samples indicative of the TOF to the scene.

15. The method of claim 14, further comprising:
determining, using a processor, a model of the scene using the set of data samples.

16. The method of claim 15, wherein the processor uses a compressive sensing to reconstruct the model of the scene.

* * * * *